US010088063B2

(12) United States Patent
Lopez Rodriguez

(10) Patent No.: US 10,088,063 B2
(45) Date of Patent: Oct. 2, 2018

(54) DEVICE FOR SUPPLYING WATER WITH TEMPERATURE AND FLOW ADJUSTMENT AND RELATED USAGE METHODS

(75) Inventor: Daniel Lopez Rodriguez, Vilanova I la Geltru (ES)

(73) Assignee: ZEYRON TECHNOLOGIES, S.L., Barcelona (ES)

( * ) Notice: Subject to any disclaimer, the term of this patent is extended or adjusted under 35 U.S.C. 154(b) by 392 days.

(21) Appl. No.: 13/582,379

(22) PCT Filed: Feb. 3, 2011

(86) PCT No.: PCT/ES2011/070074
§ 371 (c)(1),
(2), (4) Date: Aug. 31, 2012

(87) PCT Pub. No.: WO2011/113979
PCT Pub. Date: Sep. 22, 2011

(65) Prior Publication Data
US 2012/0330468 A1 Dec. 27, 2012

(30) Foreign Application Priority Data

Mar. 16, 2010 (ES) .................................. 201030385

(51) Int. Cl.
G05D 23/13 (2006.01)
F16K 11/24 (2006.01)
F16K 11/20 (2006.01)

(52) U.S. Cl.
CPC ............ *F16K 11/24* (2013.01); *F16K 11/207* (2013.01); *G05D 23/1393* (2013.01)

(58) Field of Classification Search
CPC ........... B01F 13/1055; B01F 15/00207; G01N 30/34; F16K 11/24; F16K 11/207; G05D 23/1393

(Continued)

(56) References Cited

U.S. PATENT DOCUMENTS 2,837,282 A    6/1958  Budde et al.
4,126,293 A *  11/1978 Zeuner ............... F15B 13/0433
                                                      137/625.64
(Continued)

FOREIGN PATENT DOCUMENTS

EP    0 195 271 A2    9/1986
EP    0 529 983 A2    3/1993
(Continued)

OTHER PUBLICATIONS

International Search Report (PCT/ISA/210) dated Jun. 20, 2011, by the Spanish Patent Office as the International Searching Authority for International Application No. PCT/ES2011/070074.

(Continued)

Primary Examiner — Thomas C Lee
Assistant Examiner — Alan Chu
(74) Attorney, Agent, or Firm — Dinsmore & Shohl LLP

(57) ABSTRACT

Device for supplying water with temperature and flow adjustment and related usage methods. Temperature and flow adjustment device of the type comprising a cold-water inlet and a hot-water inlet each provided with solenoid valves that are adjustable by the user using means for selecting the flow rate and temperature of the water mixed to be supplied and a control unit to adjust the flow rates of cold water and hot water supplied by the respective inlets, in which the device also comprises a mixer connected downstream of the solenoid valves and a mixed-water output characterized in that the inlets of the mixer coming from the solenoid valves face one another.

20 Claims, 10 Drawing Sheets

(58) Field of Classification Search
USPC .......................................................... 700/285
See application file for complete search history.

(56) References Cited

U.S. PATENT DOCUMENTS

| | | | |
|---|---|---|---|
| 4,680,720 A | | 7/1987 | Jiro et al. |
| 4,756,030 A | | 7/1988 | Juliver |
| 5,085,399 A | * | 2/1992 | Tsutsui et al. ............. 251/30.03 |
| 5,231,722 A | * | 8/1993 | Shacklock et al. ............... 8/159 |
| 5,915,592 A | * | 6/1999 | Mehus .................... B67D 7/74 222/1 |
| 6,286,764 B1 | * | 9/2001 | Garvey ................ G05D 7/0635 236/12.12 |
| 6,290,139 B1 | * | 9/2001 | Kolze ................ G05D 23/1393 236/12.11 |
| 6,708,895 B1 | * | 3/2004 | Knapp .......................... 236/12.1 |
| 7,448,553 B2 | * | 11/2008 | Schmitt ...................... 236/12.11 |
| 7,458,520 B2 | * | 12/2008 | Belz et al. ................. 236/12.12 |
| 2003/0088338 A1 | * | 5/2003 | Phillips ................ B67D 1/1204 700/282 |
| 2008/0112843 A1 | * | 5/2008 | Peel et al. ......................... 422/2 |
| 2010/0032488 A1 | * | 2/2010 | Yates .......................... 236/12.1 |

FOREIGN PATENT DOCUMENTS

| | | | |
|---|---|---|---|
| EP | 0 401 468 B1 | | 7/1994 |
| ES | 237547 A3 | | 1/1958 |
| ES | 124367 U | | 1/1967 |
| ES | 2029390 A6 | | 8/1992 |
| ES | 2057210 T3 | | 10/1994 |
| ES | 1 030 460 U | | 8/1995 |
| ES | 1 067 222 U | | 5/2008 |
| GB | 798 298 A | | 7/1958 |
| GB | 1 354 290 A | | 6/1974 |
| WO | WO2006/061657 | * | 6/2006 ............... E03C 1/05 |
| WO | WO2007/007093 | * | 1/2007 ............... E03C 1/05 |
| WO | WO 2007/007093 A2 | | 1/2007 |
| WO | WO 2009/053510 A1 | | 4/2009 |

OTHER PUBLICATIONS

European Search Report for EP 11 75 5729, dated Oct. 10, 2013.
Spanish Search Report with English language translation dated Nov. 22, 2010 (2 pages total).

* cited by examiner

DEVICE FOR SUPPLYING WATER WITH TEMPERATURE AND FLOW ADJUSTMENT AND RELATED USAGE METHODS

The present invention relates to a system for supplying water with temperature and flow adjustment, of the type comprising a cold-water inlet and a hot-water inlet each provided with electrically-operated valves for adjusting the flows of cold water and hot water supplied by the respective inlets, to a mixed-water output, means for selection by the user of the flow and temperature of the mixed water provided and a control unit which, depending on the selection made by the user, acts on the proportional electrically-operated valves varying the flows of cold water and hot water, in this way adjusting the flow and temperature of the mixed water supplied.

Different systems for the supply of mixed water at an adjustable temperature obtained from a hot water inlet and a cold water inlet are known.

In some cases these systems have thermostatic valves and in others motor-driven valves or proportional electrically-operated valves which can be used to adjust the flows of cold water and hot water required to provide mixed water at a certain temperature.

Some examples of these systems are described in Utility Model ES 1 067 222 U by the same applicant, in European Patent Application EP0195271, or in Patent U.S. Pat. No. 4,756,030.

However, obtaining mixed water with a stable flow and temperature as selected by the user is especially complicated, as it requires quick and reliable control of the valves used to control the flows of cold water and hot water.

In these systems a temperature sensor located in the pipe or outlet for the mixed water is frequently used and values provided by that temperature sensor are used to vary the position of the proportional electrically-operated valves.

In known systems, the proportional electrically-operated valves are located on the cold water and hot water inlet conduits, these pipes subsequently joining into a single conduit supplying the mixed water.

This arrangement has a first inconvenience in use, given that the flows of cold water and hot water both have to circulate through the common outlet conduit for a certain distance in order to achieve a homogeneous temperature for the mixed water, as a result of which the user is aware of temperature changes due to a lack of uniformity in the temperature of the mixed water, especially when the tap or outlet is close to the mixing zone.

Another of the disadvantages of these systems is the difficulty of controlling the proportional electrically-operated valves while these are changing position, and especially during the initial stages of opening and closing, and during movements of greater length, for example between the extreme open and closed positions.

When proportional electrically-operated valves are close to the closed position, the water pressure at the inlet to the proportional electrically-operated valves is considerably greater than the pressure obtained at the outlet of those proportional electrically-operated valves, and when the proportional electrically-operated valves have to move over a great distance, the control unit provides them with a constant change in energy, giving rise in both cases to destabilisation of the proportional electrically-operated valves and consequently an irregular variation in the temperature and flow of the mixed water obtained, and as a consequence loss of control over the temperature and flow of the system's output.

The device for supplying water with temperature and flow adjustment to which the invention relates has a number of special features through which a stable supply of mixed water is provided with a constant flow and temperature selected by the user, through mixing the cold water and the hot water and homogenising the said mixture.

Surprisingly, arranging the flows from the electrically-operated valves mentioned in such a way that they are mutually opposed to each other and interconnected to a homogenisation chamber provides a circulating flow within the chamber, with the result that the temperature of the mixed water is more uniform than in the mixing chambers according to the prior art, in that the temperature of the hot water floats above the cold water and the user therefore notes a lack of uniformity in the mixture.

Furthermore, this invention guarantees stable movement of the plugs of the proportional electrically-operated valves and controlled variation of the flows of cold water and hot water supplied in any of the positions and travels of the said proportional electrically-operated valves.

The device to which this invention relates is of the type comprising a cold water inlet and a hot water inlet provided with respective electrically-operated valves which can be adjusted by the user through means for selecting the flow and temperature of the mixed water supplied and a control unit for adjusting the flows of cold water and hot water supplied by the respective inlets, in which the device further comprises a mixer connected downstream from the said electrically-operated valves and a mixed water outlet in which the inlets to the said mixer originating from the said electrically-operated valves are mutually opposed to each other.

Furthermore, preferably, two inlets are provided in the mixer for connection of the cold water and hot water supplies, and communicate through respective passages with channels located perimetrally around the respective mutually opposed inlets defined in the mixing body and in which are located respective electrically-operated solenoid valves provided with respective membranes associated in their central part by means of respective plugs or cores with the respective operating solenoids which can be moved in a controlled way by a control unit on the basis of the selection made by the user. Even more preferably, when the solenoids are not subjected to any electromagnetic force, the plugs of the said electrically-operated valves are subject to a force provided by a spring to ensure that they make a seal when the solenoid of the electrically-operated valve is not subjected to an electromagnetic field, that is the electrically-operated valves are of the type which are preferably normally closed. Surprisingly, the inclusion of this spring in the plug mechanism makes it possible for the percentage opening of the said plug to be constant when the solenoid is subjected to a magnetic field, as it balances out the force originating from the plug and the force generated by the solenoid through the action of the magnetic field. Furthermore, the control unit for the device according to this invention gives rise to positioning involving a time gradient when changing the position of the electrically-operated valve, reducing the hysteresis in the system.

Furthermore, between the two mutually opposed inlets, the mixer comprises a homogenisation chamber located coaxially with the said mutually opposite inlets in which a frontal shock between the entering flows of cold water and hot water and homogenisation of the temperature of the mixed water is set up, this homogenisation chamber being provided in its intermediate zone with an outlet for the supply of mixed water. The frontal shock between the flows of cold water and hot water within the homogenisation chamber favours their mixing, in such a way that the mixed water leaves the said homogenisation chamber at a uniform temperature, and ready for supply through a tap or outlet which may be located very close to the said homogenisation chamber without the user being aware of the usual temperature changes due to irregular mixing.

Another characteristic of the invention is that the outlet, which is preferably defined to be equidistant from each of the extremities of the homogenisation chamber, comprises a retaining disc with an opening of smaller size than the outlet pipe to restrict the passage of water to the outlet, ensuring a slight pressure within the homogenisation chamber or stabilising, linearising and securing the positioning of the cores or plugs of the proportional electrically-operated valves at the selected working points whenever there is a flow for at least one of the proportional electrically-operated solenoid valves. Surprisingly, the incorporation of this retention disc to maintain pressure within the homogenisation chamber gives rise to turbulence in the outlet pipe, ensuring greater mixing than in devices according to the prior art.

According to this invention, the control unit has a microcontroller, a computer program or the like which positions the plugs or cores of the proportional electrically-operated valves through a positioning system based on a matrix working map and according to the selection made by the user through a panel or control means in order to vary the temperature and flow of the water supplied.

Therefore one object of this invention is a method for adjusting flow and temperature through a device of the type previously mentioned which comprises the stages of:
  calibrating the device;
  establishing the operating point; and
  operating at least one electrically-operated valve;
in which calibration of the device comprises the generation of an operating matrix comprising the stages of:
  opening a first electrically-operated valve until it provides the minimum flow to the installation;
  storing the positions of the two electrically-operated valves at one of the extreme coordinates of the matrix;
  opening the first and second electrically-operated valve until it gives rise to the maximum flow at the maximum temperature in the installation;
  storing the positions of the two electrically-operated valves at another of the extreme coordinates of the matrix;
  calculating data corresponding to the remaining coordinates through interpolation; and
  storing the remaining positions of the matrix.

Preferably, the matrix is interpolated in such a way that the elements corresponding to the same row are the pair of positions of the electrically-operated valves for maintaining the same flow at different temperatures.

In an even more preferred way, the matrix is interpolated in such a way that all the elements corresponding to the same row are the pair of positions of the electrically-operated valves for maintaining the same temperature at different flows.

Furthermore, preferably, the stage of establishing operation comprises selecting the point in the matrix at which it is required that the device should operate by selection through the selection means.

Even more preferably this condition is established in steps summing a single unit in only one coordinate of the matrix and when the data from a cell in that matrix are transmitted to the electrically-operated valves they open or close correspondingly to the value in the cell.

Finally, in the stage of operating the control unit the signal originating from the matrix is preferably converted into electromagnetic signals on the solenoid of at least one of the electrically-operated valves to bring about movement of the plug.

In a variant embodiment the cold water and hot water inlets are provided with respective flow measuring devices and respective temperature sensors. These temperature and flow sensors are preferably located upstream of the electrically-operated valve.

Furthermore, according to the inlet temperatures of the cold water and the hot water and the choice made by the user through a selection panel or means, the microprocessor performs a thermal calculation and determines the flows of cold water and hot water necessary to bring about supply of the flow and temperature of mixed water selected by the user via the outlet from the homogenisation chamber; repositioning the plugs or cores of the proportional electrically-operated valves to vary the temperature and flow of the water supplied in positions corresponding to the calculation performed. Thus, in this embodiment, the system performs a thermal calculation on the basis of the inlet temperatures of the cold water and hot water, adjusting the cold water and hot water flows to obtain mixed water at the flow and temperature selected by the user.

As a consequence, another object of this invention is to provide a method for adjustment of flow and temperature which comprises the stages of:
  calibrating the device at at least one operating point;
  measuring the inlet flows and temperatures to the device;
  selecting the percentage opening of each electrically-operated valve through the control unit;
  operating at least one electrically-operated valve;
  in which, in the stage of calibrating the device measurements of minimum temperature, minimum flow, maximum temperature and maximum flow are made at at least one operating point in order to determine the operating limits of the device and these are stored in the said device as predetermined operating limits.

Preferably, minimum temperature, minimum flow, maximum temperature and maximum flow values for at least two outlets are stored in the calibration stage, and depending on the maximum flow and temperature values the limiting operating conditions for each operating point are indicated to the user.

On the other hand, during the stage of operating the device at least one electrically-operated valve is preferably opened in relation to appearance of the output parameters calculated using the parameters established by the user.

In the case where there are two operating points, preferably with different hydraulic resistances, when the water outlet is switched from a first to a second operating point maintaining the settings for the first operating point, the method comprises the stages of:
  closing the outlet at the first operating point;
  maintaining the position of the electrically-operated valves of the device ignoring the calculation of the outlet parameters;
  opening the outlet at the second operating point; and
  maintaining the selected percentage opening of the valves previously determined, independently of the flow measurements.

In this way the system avoids entering operating conditions which give rise to fluctuations in the electrically-operated valves without reaching a clearly defined stable point in a reasonable time.

In order to supplement the description provided and in order to assist understanding of the features of the invention this description is accompanied by a set of drawings which show the following purely illustratively and without limitation:

Figure 4:
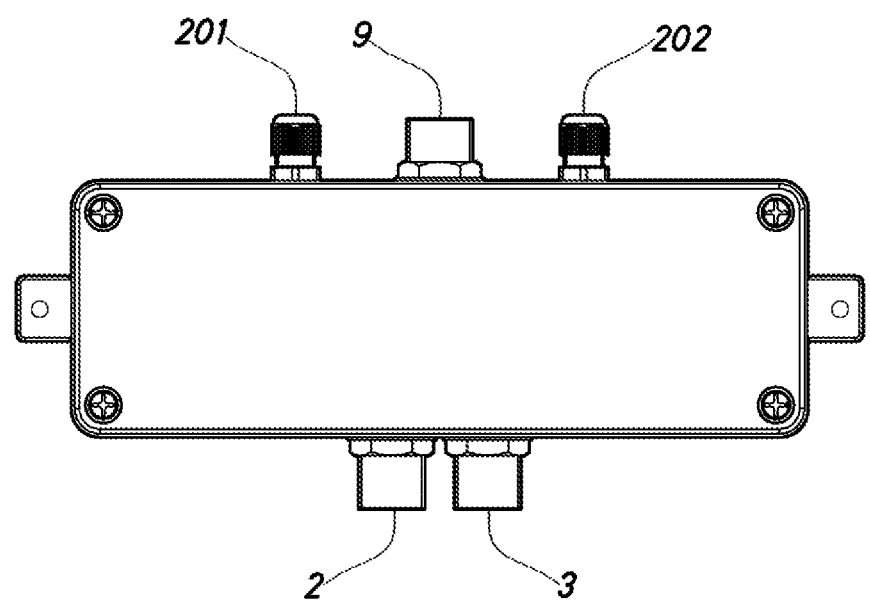

FIG. 4 corresponds to an encapsulated device according to this invention showing the arrangement of its inlets and outlets.

Figure 5:
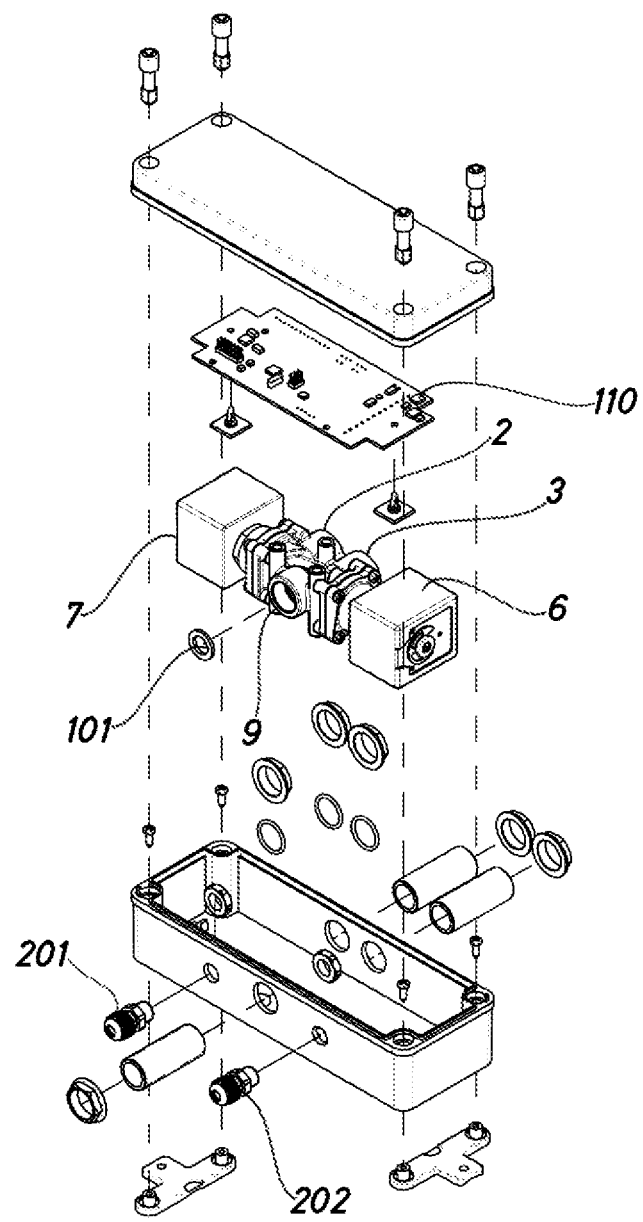

FIG. 5 shows an exploded view of a device according to this invention.

Figure 6:
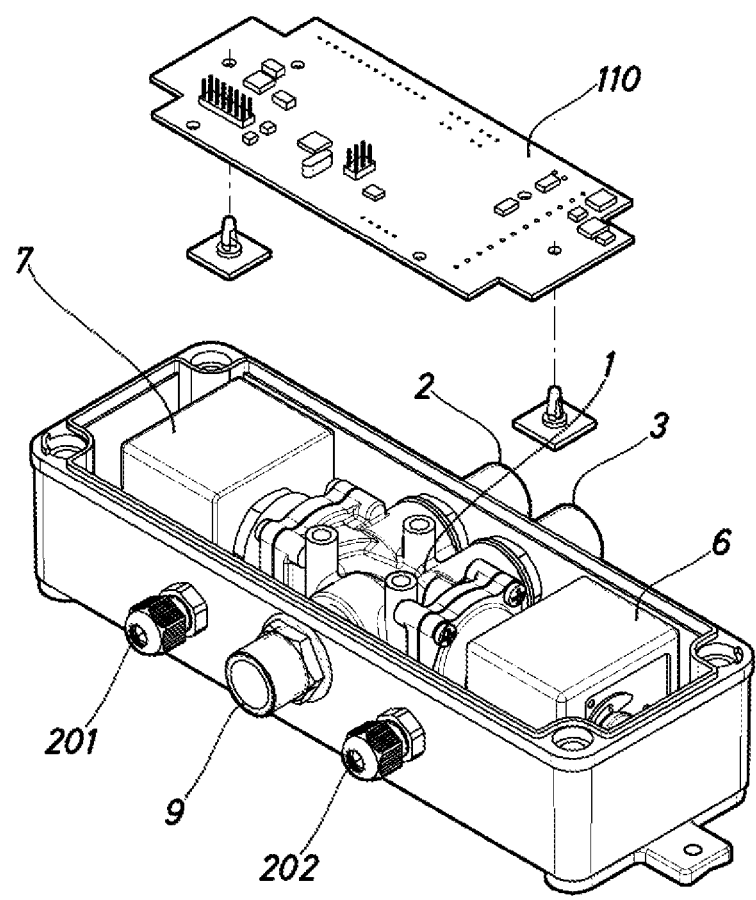

FIG. 6 shows the device in FIG. 5 partly assembled.

Figure 7:
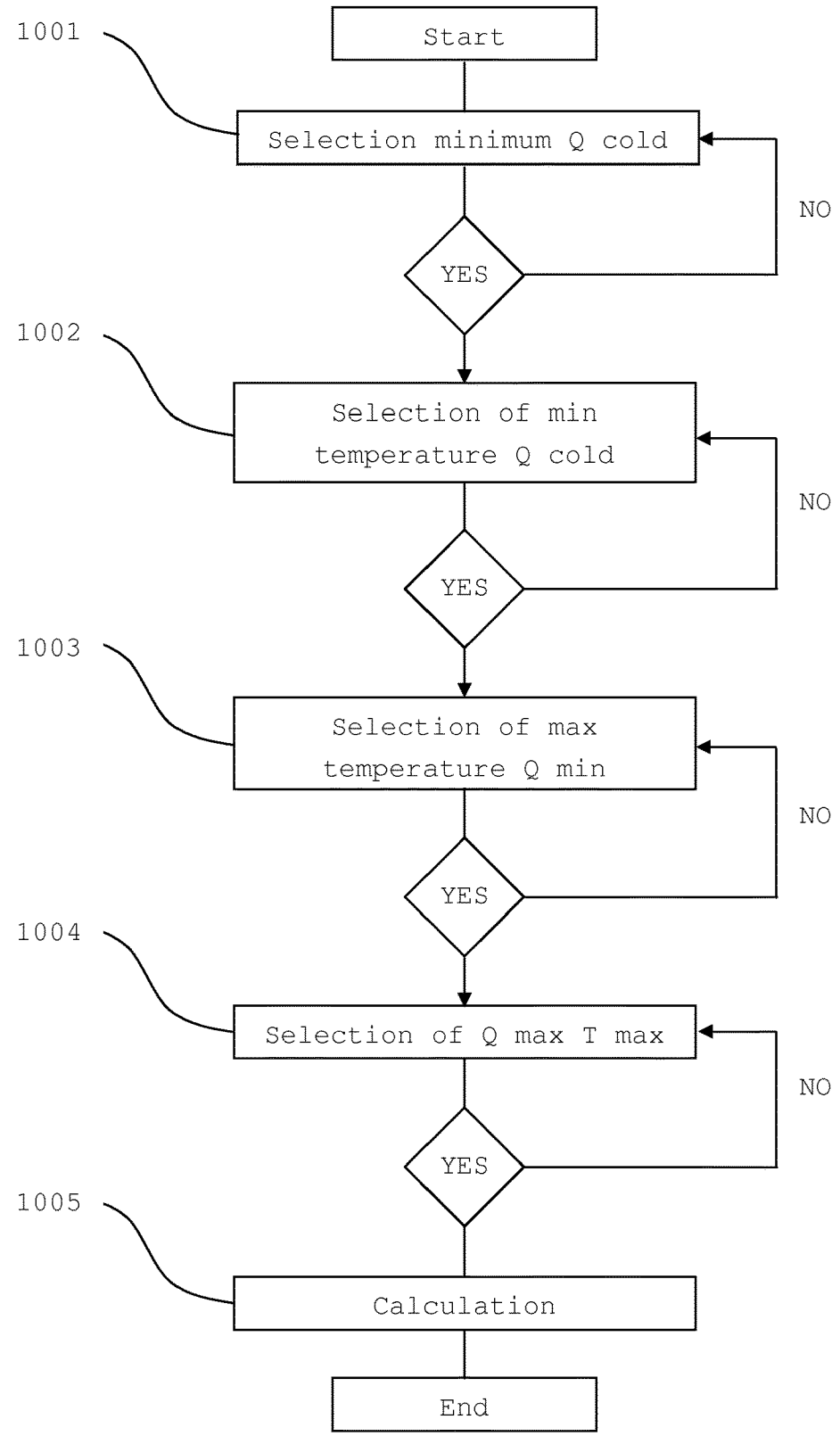

FIG. 7 shows a flow diagram of the process for calibrating the device in FIGS. 1-6.

Figure 8:
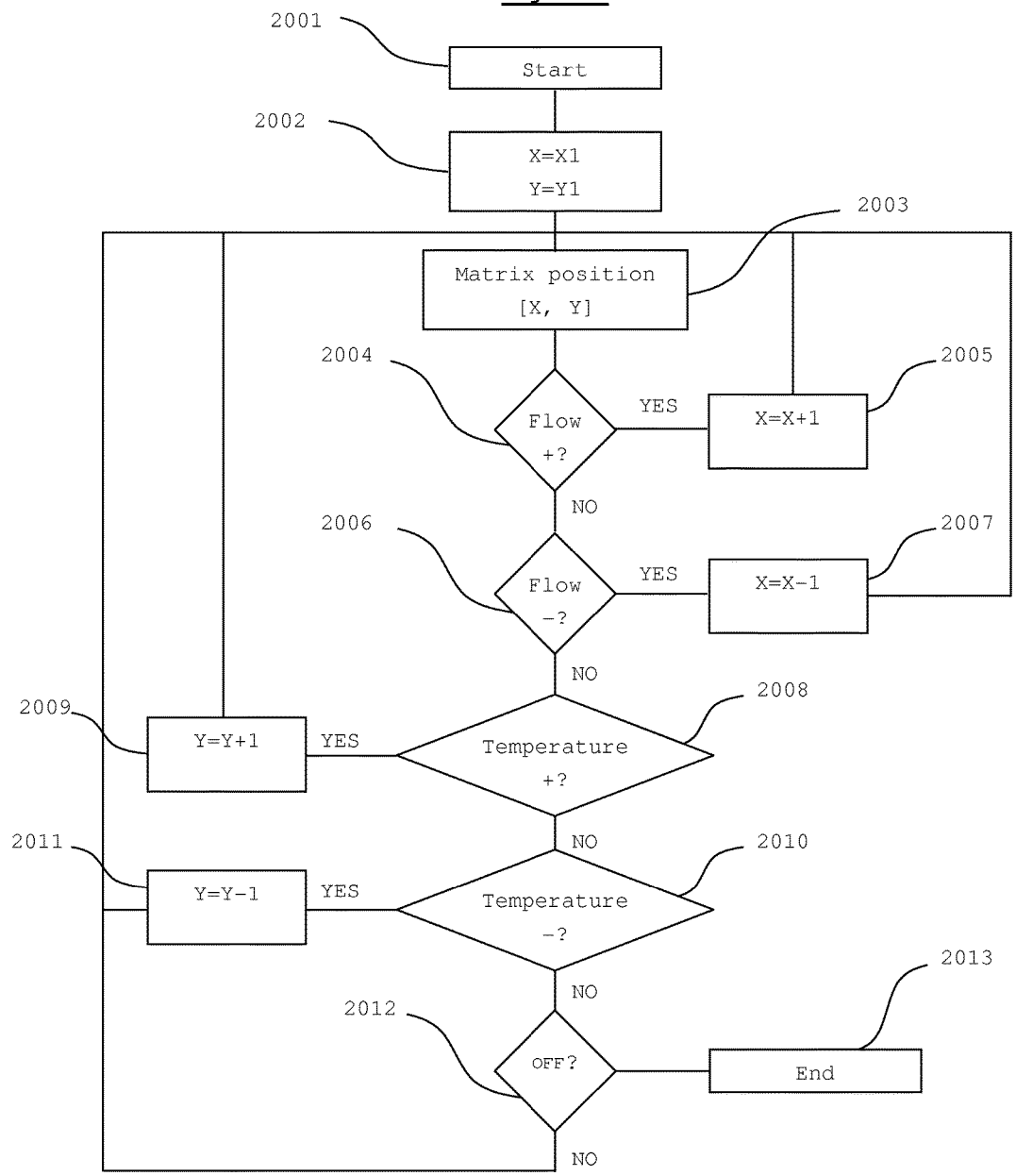

FIG. 8 shows a flow diagram of the operating process of the device in FIGS. 1-7.

Figure 9:
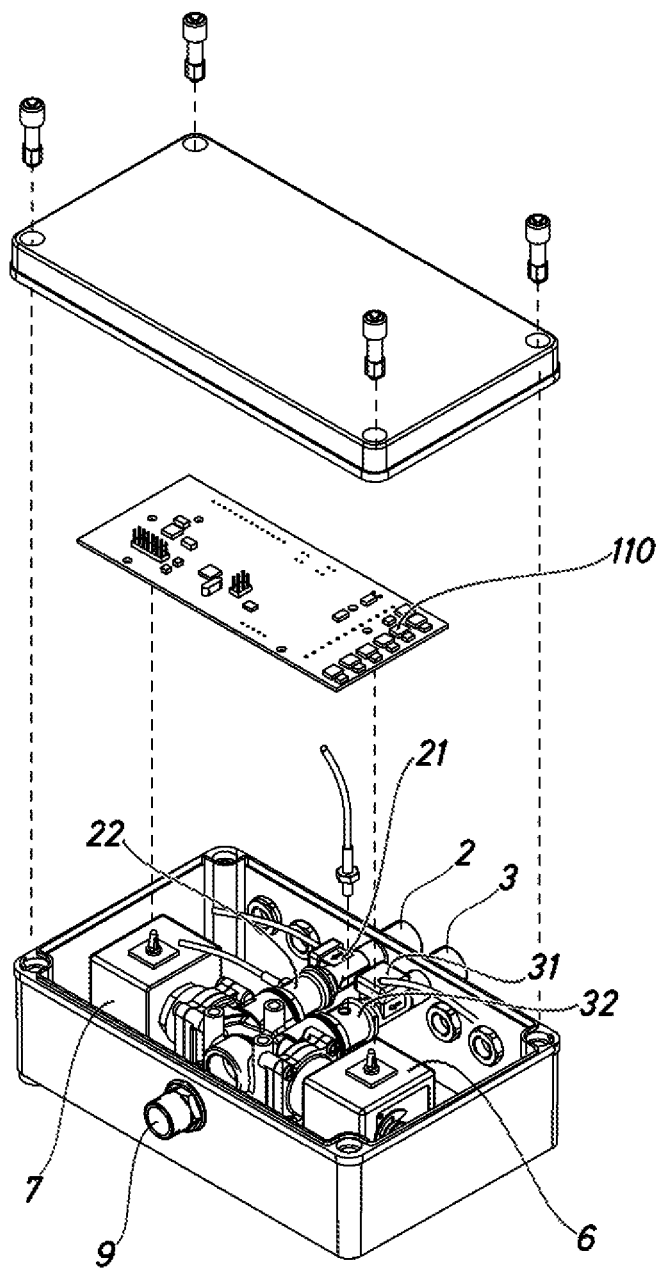

FIG. 9 shows a second embodiment of a device according to this invention which includes temperature and flow sensors.

Figure 10:
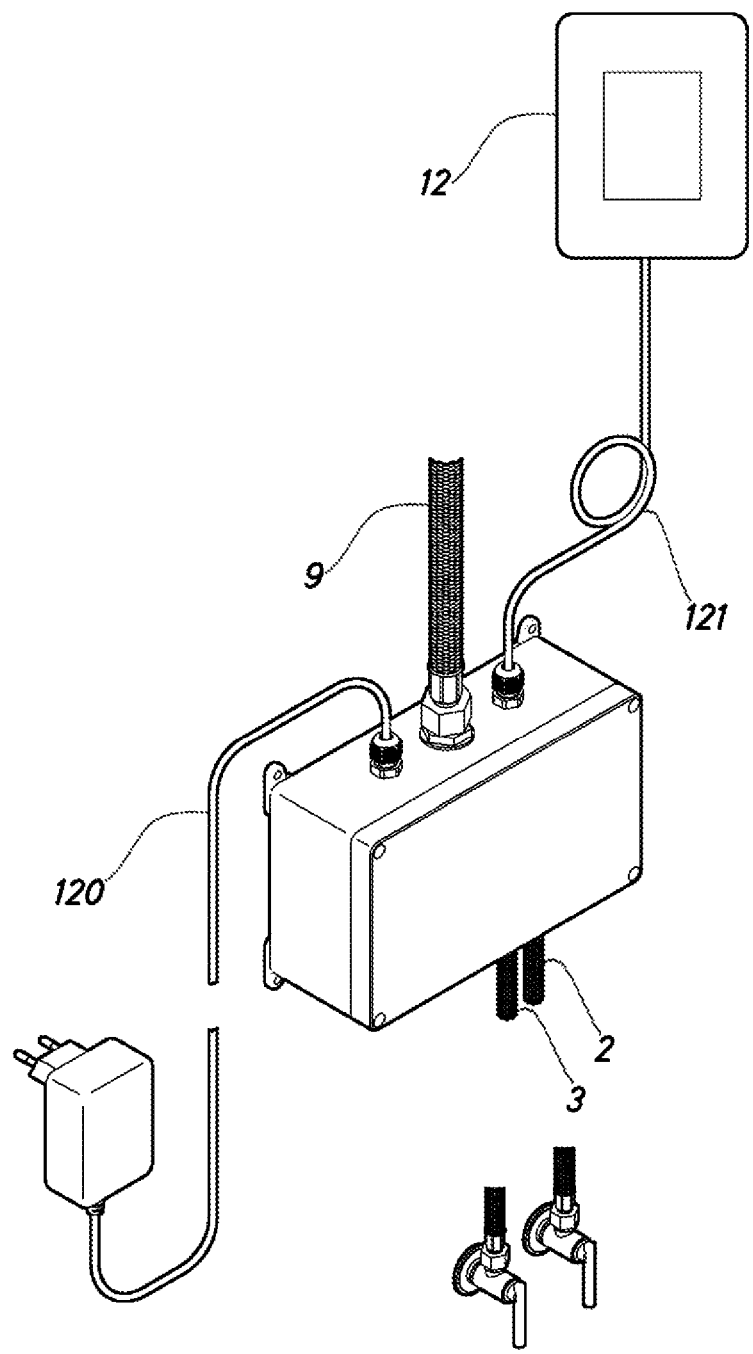

FIG. 10 shows the device in FIG. 8 installed in an arrangement according to the prior art.

In a first embodiment illustrated in FIGS. 1 to 8 the water supply system with flow and temperature adjustment comprises a mixing body or mixer —1— in which there are provided two inlets or inlet openings —2—, —3— for connection of the cold water and hot water supplies.

These inlet openings —2—, —3— communicate through respective passages —23—, —33— with channels —41—, —51— located perimetrally around respective openings —4—, —5— provided in mixing body —1— which are mutually opposite and in which are located respective proportional electrically-operated valves —6—, —7— provided with respective membranes —61—, —71— associated in their central portion with respective cores or plugs —62—, —72— with the solenoids (not shown) of the respective electrically-operated valves.

Figure 3:
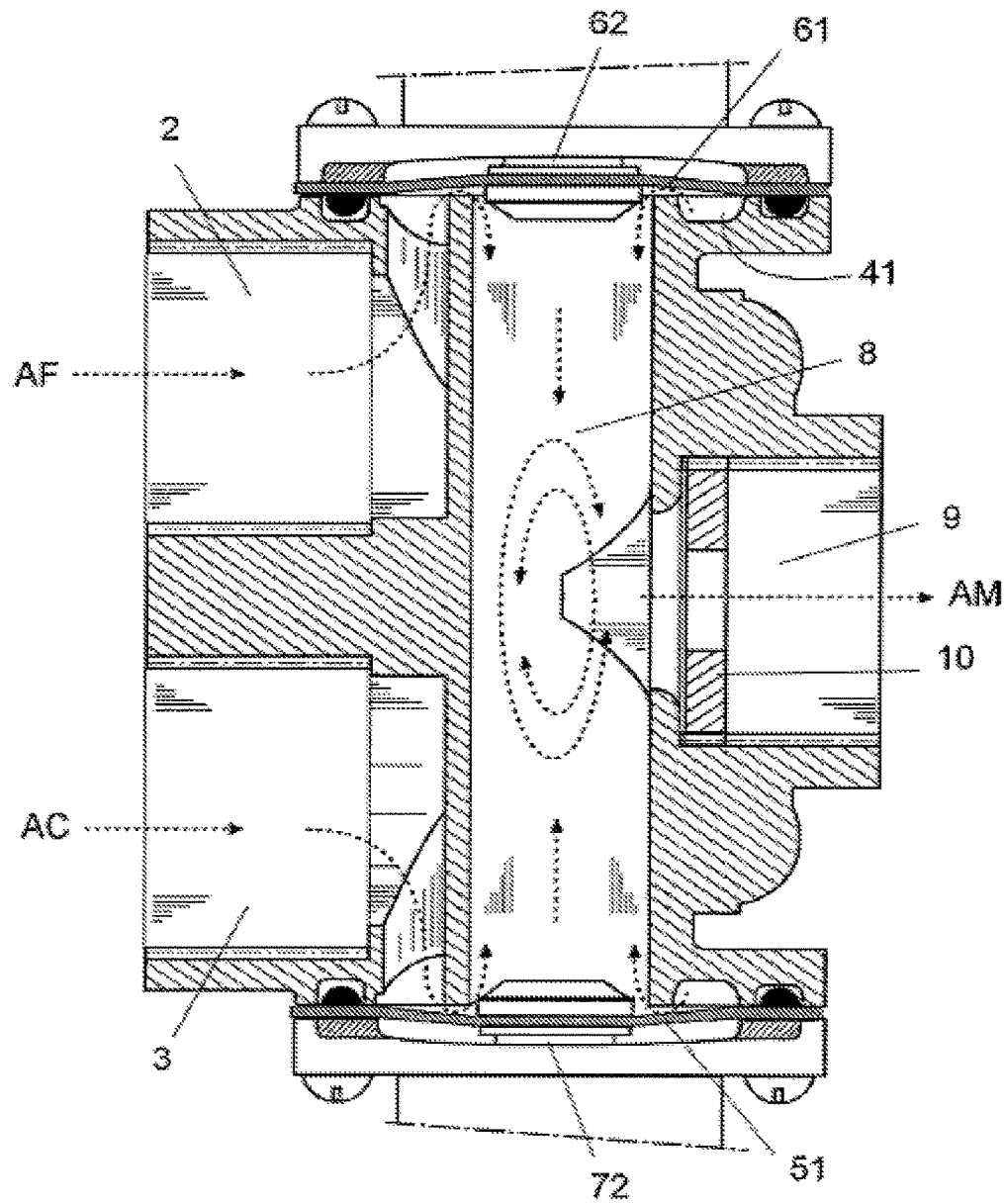
FIG. 3 shows the internal functioning of a mixing electrically-operated valve according to this invention.

Between openings —4—, —5— mixing body —1— comprises a homogenisation chamber —8—arranged coaxially with openings —4—, —5— in which the frontal shock between the entering flows of cold water and hot water is produced together with homogenisation of the temperature of the mixed water before it is supplied through the outlet opening —9—located laterally in the intermediate zone of homogenization chamber —8—. In FIG. 3, the flow trajectories of cold water (AF) and hot water (AC), and homogenisation of the temperature of the mixed water (AM), within the system are shown by arrows with dashed lines, and this shows that a circulating flow giving rise to an initial mixing between the water coming from cold water inlet —2— and hot water inlet —3— is produced within the homogenisation chamber.

Outlet —9— comprises a retaining disc —10— with a retention opening —101— to restrict the passage of mixed water —AM— and ensure the existence of a slight pressure within homogenisation chamber —8—to stabilise, linearise and secure the positions of cores or plugs 62—, —72— of proportional electrically-operated valves —6—, —7— at the selected working points as long as there is a flow through at least one of the proportional electrically-operated valves —6—, —7—. The retaining disc —10— may have a uniform circumference equivalent to a uniform circumference of the outlet —9—. Furthermore, the location of this retention opening —101— causes turbulence to be set up in the outlet pipe giving rise to second mixing, creating further homogenisation. This retention opening is of a diameter smaller than the diameter of outlet opening —9—.

Figure 1:
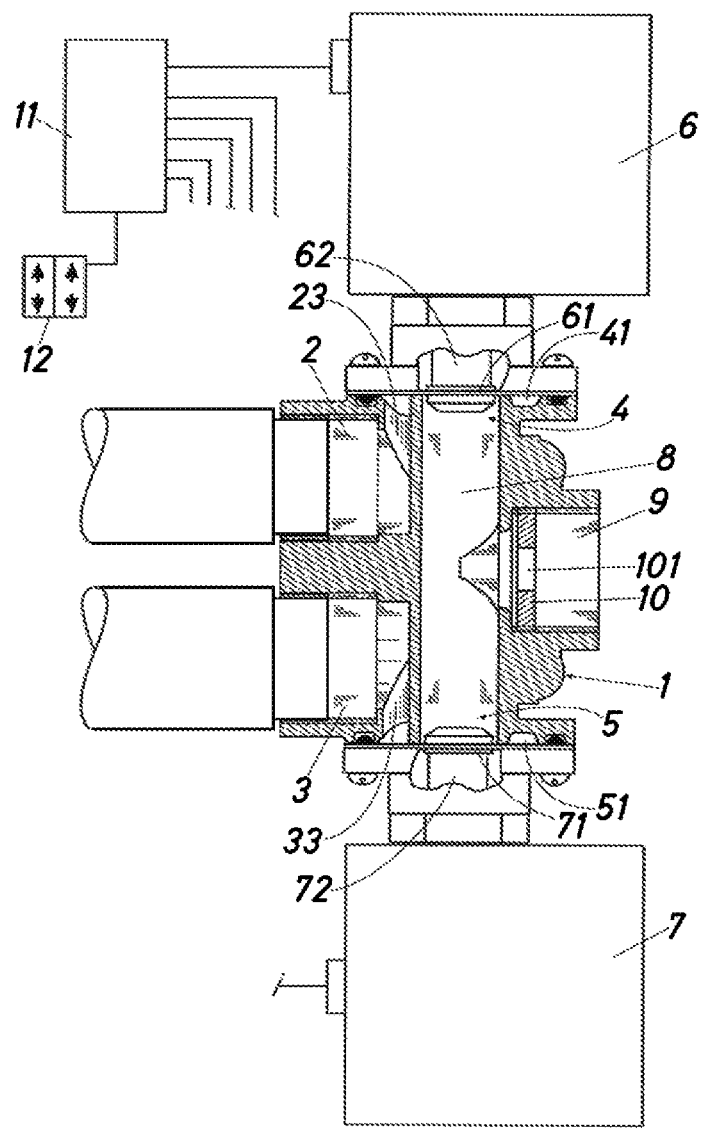
FIG. 1 shows an elevation view of an embodiment of the system with the mixing body in cross-section.
Figure 2:
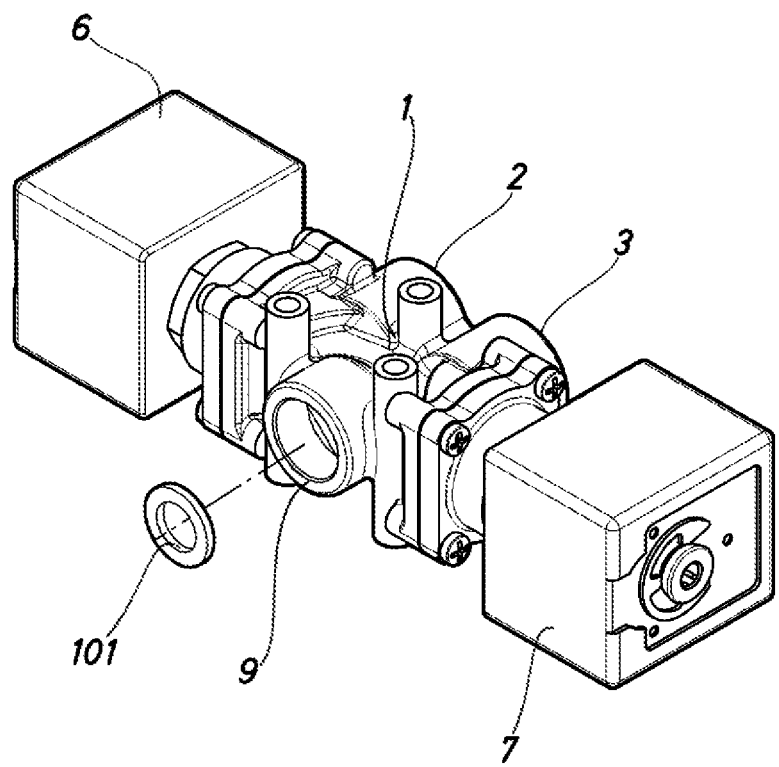
FIG. 2 shows a respective view of the electrically-operated valves mounted in opposing positions.

As may be seen in FIG. 1, the system comprises a control unit —11— responsible for controlling functioning of the system and positioning cores or plugs —62—, —72— independently in appropriate positions to permit the passage of specific flows of cold water —AF— and hot water —AC— and provide mixed water —AM— according to the parameters selected by the user in selection means —12— represented by a panel connected to control unit —11—.

FIG. 4 shows an arrangement in which hot water inlet opening —3—, cold water inlet opening —2—, outlet opening —9— and glands —201—, —202— for entry of the selection means and electrical power supply are illustrated.

A method for adjusting the flow and temperature in a device according to this invention comprises calibration and subsequent operation based on an operating matrix.

This calibration process is illustrated in the flow diagram in FIG. 7.

In order to simplify explanation of the process it will be understood that in the configuration matrix the rows in the matrix correspond to the pairs of values relating to the opening of the electrically-operated valves for maintaining a temperature by varying the flow. That is to say each row corresponds to a temperature and each column corresponds to a flow. Nevertheless, the rows may correspond to flows and the columns to temperatures, retaining the same inventive concept.

Each element in the matrix comprises a pair of values and each value corresponds to a value relating to the opening of each of the electrically-operated valves in the device. Calibration is firstly performed by determining four values corresponding to the coordinates of two opposite extremes of the matrix and subsequently calculating the remaining elements.

In order to locate the extreme positions the flow of cold water is increased until the minimum cold water flow —1001— is found, and then the minimum temperature which the user requires for this minimum flow —1002— is located. Once this point has been located the pair of data corresponding to the flow at this point are stored as an extreme element of the matrix.

Then the electrically-operated valves are repositioned to achieve the maximum temperature point with their minimum flow —1003— and the flow is then increased until the maximum flow at the previously selected maximum temperature —1004— is located.

Once this point has been located the pair of data corresponding to the flow at this point are stored as an extreme element opposite to the extreme point previously stored in the matrix.

Once the two extreme points of the matrix have been located the remaining positions of the matrix are calculated —1005— using an interpolation algorithm according to the prior art.

Once the device has been calibrated and the values of the operating matrix have been found, proportional electrically-operated valves —6—, —7— receive a user request for temperature or flow according to the flows and temperatures of the hot water —AC— and cold water —AF— via selection means —12—. This control unit alters the matrix position corresponding to the new set point and positions the cores or plugs —62—, —72— of electrically-operated valves —6—, —7— in the positions specified in the matrix in order to supply mixed water —AM— with the flow and temperature selected by the user in the selection means.

In order to clarify the device's operating process FIG. 8 shows a flow diagram of the operation of a device according to this invention.

In this particular embodiment positions in the matrix corresponding to rows have been referred to as "X" and positions in the matrix corresponding to columns have been referred to as "Y".

The process begins —2001— when the device is switched on. As a default the device can start at any position in the matrix previously defined by the user —2002—. This initial position is defined as matrix position —2003—. Subsequently, it is determined whether the user has pressed one of the control options available, these options being: increase flow —2004—, decrease flow —2006—, increase temperature —2008—, decrease temperature —2010—, switch off the device —2012—, among others. If the user requires an increased flow the present position of row —2005— is increased, if on the contrary the user requires a reduced flow the present position of row —2007— is decreased by one unit.

With regard to temperature, if the user requires the temperature to be increased the present position of column —2009— is increased by one unit, and if on the contrary the user requires the temperature to be reduced the present position of column —2011— is decreased by one unit.

Whenever a change of position occurs in the matrix —2003— the control unit according to this invention repositions the electrically-operated valves representing the temperature or flow change required by the user. In a particular embodiment, control unit —11— is an integrated circuit —110— located on the device and comprises a microprocessor.

Finally, in order to close the electrically-operated valves and bring operation of the device to an end —2013—, this command is also transmitted through the selection means.

As a consequence movement of the cores or plugs by the control unit takes place through means for controlling the positions of each of the electrically-operated solenoid valves for mixing the fluids, applying the necessary energy to the respective solenoids progressively, as described in the matrix previously described.

FIG. 9 shows another embodiment in which the device according to this invention has temperature sensors —21—, —31— and flow sensors —22—, —32— in addition to the elements previously described.

These sensors are located upstream of electrically-operated valves —6—, —7— and this arrangement makes it necessary for the temperature and flow at outlet —9— to be calculated on the basis of measurements at the inlets.

For correct operation the electrically-operated valves operate using the set parameters accessed through the selection means and the parameters measured by the flow and temperature sensors as a basis. The microprocessor carries out an internal calculation and determines the positions in which the valves must be located in order to obtain the flow and temperature required by the user.

In order to achieve more accurate results, the device according to this invention requires a calibration process in which the maximum and minimum flow at the outlet from the device is defined.

This calibration procedure is particularly advantageous when the device is operated in an installation with multiple electrically-operated valves located at operating points which feed the outlet —9— from the device.

The process comprises determining the maximum and minimum flows and temperatures for each of the outlets bearing in mind that the hydraulic resistance of each of the outlets may vary. Once the flow values for each outlet have been stored the control unit performs precise calculations to maintain energy equilibrium independently of the changes in hydraulic resistance which may occur at the various operating points.

FIG. 10 relates to a device according to this invention installed in a conventional water installation. In addition to what has been described above, the device comprises a power supply cable —120— and a cable —121— for the tactile interface.

In other embodiments of this invention the devices may include industrial and/or Internet communication elements, such as a communications board, in order to achieve direct access and monitoring of the system and the ability to alter remotely all the configuration values previously described, the possibility of remotely displaying consumption, switching-off the system and configuring the maximum temperatures in the control unit.

Now that the nature of the invention has been sufficiently described together with a preferred embodiment it is pointed out for the appropriate purposes that the materials, shape, size and arrangement of the elements described may be modified so long as this does not bring about any change in the essential characteristics of the invention which is claimed below.

The invention claimed is:

1. A device for adjustment and control of flow and temperature, comprising:
   a cold water inlet and a hot water inlet each provided with an electrically-operated valve adjustable by a user, wherein the cold water inlet and hot water inlet originating from the electrically-controlled valves are mutually opposite and coaxial to each other;
   a control unit configured to adjust cold water and hot water supplied by the respective inlets, the control unit comprising respective temperature sensors and respective flow measuring sensors for the hot water inlet and the cold water inlet, wherein the temperature and the flow measuring sensors are located upstream of the electrically-operated valves; and
   a mixer connected downstream of the electrically-operated valves and a mixed water outlet;
   wherein the mixer comprises a temperature homogenising chamber located coaxially with the cold water inlet and the hot water inlet, the mixed water outlet being located in an intermediate zone of the temperature homogenising chamber and comprising a retaining disc having a uniform circumference equivalent to a uniform circumference of the outlet and having a retention opening of smaller size than the mixed water outlet to restrict the flow of mixed water to the outlet, wherein the location of the retention opening is configured to cause turbulence in the outlet pipe in the form of additional mixing that creates further homogenisation;
   wherein flow entering the temperature homogenising chamber from the cold water inlet and the hot water inlet is perpendicular to flow through the mixed water outlet; and
   the electrically-operated valves are solenoid valves provided with respective membranes associated with the respective operating solenoids, wherein the electrically-operated valves comprise a spring to seal the electrically-operated valves when the solenoids of the electrically-operated valves are not exposed to an electromagnetic field.

2. The device according to claim 1, wherein the outlet for the supply of water is located equidistantly from the extremities of the chamber.

3. The device according to claim 1, wherein the electrically-operated valves are of the normally closed type.

4. The device according to claim 1, wherein the control unit comprises a communications board.

5. The device according to claim 1 further comprising a power supply cable and a cable for a tactile interface.

6. The device according to claim 1, wherein the retention opening of the retaining disc is configured to restrict the passage of mixed water and provide pressure within the homogenising chamber to stabilise, linearise and secure positions of cores or plugs of the electrically-operated solenoid valves at selected working points based upon a flow through at least one of the proportional electrically-operated solenoid valves.

7. A method for adjustment of water flow and temperature through a device for the adjustment and control of flow and temperature, the device comprising:
a cold water inlet and a hot water inlet each provided with an electrically-operated valve adjustable by a user, wherein the cold water inlet and hot water inlet originating from the electrically-controlled valves are mutually opposite and coaxial to each other;
a control unit configured to adjust cold water and hot water supplied by the respective inlets, the control unit comprising respective temperature sensors and respective flow measuring sensors for the hot water inlet and the cold water inlet, wherein the temperature and the flow measuring sensors are located upstream of the electrically-operated valves; and
a mixer connected downstream of the electrically-operated valves and a mixed water outlet;
wherein the mixer comprises a temperature homogenising chamber located coaxially with the cold water inlet and the hot water inlet, the mixed water outlet being located in an intermediate zone of the temperature homogenising chamber and comprising a retaining disc having a uniform circumference equivalent to a uniform circumference of the outlet and having a retention opening of smaller size than the mixed water outlet to restrict the flow of mixed water to the outlet, wherein the location of the retention opening is configured to cause turbulence in the outlet pipe in the form of additional mixing that creates further homogenisation;
wherein flow entering the temperature homogenising chamber from the cold water inlet and the hot water inlet is perpendicular to flow through the mixed water outlet; and
the electrically-operated valves are solenoid valves provided with respective membranes associated with the respective operating solenoids, wherein the electrically-operated valves comprise a spring to seal the electrically-operated valves when the solenoids of the electrically-operated valves are not exposed to an electromagnetic field; and
wherein the electrically-operated valves control the outlet flow and temperature from the device, this method comprising the steps of:
first, calibrating the device;
then establishing the operating point; and
after establishing the operating point, operating at least one electrically operated valve;
wherein calibration of the device comprises generation of an operating matrix comprising the steps of:
opening a first electrically-operated valve to bring about the minimum flow in the installation;
storing the positions of the two electrically-operated valves at one of the extreme coordinates of the matrix;
opening the first and the second electrically-operated valves to bring about the maximum flow at the maximum temperature in the installation;
storing the positions of the two electrically-operated valves at another of the extreme coordinates of the matrix;
calculating data corresponding to the remaining coordinates by interpolation; and
storing the remaining positions of the matrix.

8. The method according to claim 7, wherein the matrix is interpolated in such a way that all the elements corresponding to the same row are the pairs of positions of the electrically-operated valves for maintaining the same flow at different temperatures.

9. The method according to claim 7, wherein the matrix is interpolated in such a way that all the elements corresponding to one row are the pairs of positions of the electrically-operated valve for maintaining the same temperature at different flows.

10. The method according to claim 9, wherein establishing operation is brought about in stages summing the single unit in only one coordinate of the matrix.

11. The method according to claim 7, wherein the stage of establishing operation comprises selecting the point in the matrix at which it is required that the device should operate through selecting the selection means.

12. The method according to claim 7, wherein data from a cell in the matrix are transmitted to the electrically-operated valves, to open or close corresponding to a value in the cell.

13. The method according to claim 7, wherein in the operating stage the control unit converts the signal originating from the matrix into electromagnetic signals acting on the solenoid of at least one of the electrically-operated valves to bring about movement of the core.

14. A method for adjustment of water flow and temperature using a device wherein the electrically-operated valves control the outlet flow and temperature from the device, the device comprising:
a cold water inlet and a hot water inlet each provided with an electrically-operated valve adjustable by a user, wherein the cold water inlet and hot water inlet originating from the electrically-controlled valves are mutually opposite and coaxial to each other;
a control unit configured to adjust cold water and hot water supplied by the respective inlets, the control unit comprising respective temperature sensors and respective flow measuring sensors for the hot water inlet and the cold water inlet, wherein the temperature and the flow measuring sensors are located upstream of the electrically-operated valves; and
a mixer connected downstream of the electrically-operated valves and a mixed water outlet;
wherein the mixer comprises a temperature homogenising chamber located coaxially with the cold water inlet and the hot water inlet, the mixed water outlet being located in an intermediate zone of the temperature homogenising chamber and comprising a retaining disc having a uniform circumference equivalent to a uniform circumference of the outlet and having a retention opening of smaller size than the mixed water outlet to restrict the flow of mixed water to the outlet, wherein the location of the retention opening is configured to cause turbulence in the outlet pipe in the form of additional mixing that creates further homogenisation;

wherein flow entering the temperature homogenising chamber from the cold water inlet and the hot water inlet is perpendicular to flow through the mixed water outlet; and the electrically-operated valves are solenoid valves provided with respective membranes associated with the respective operating solenoids, wherein the electrically-operated valves comprise a spring to seal the electrically-operated valves when the solenoids of the electrically-operated valves are not exposed to an electromagnetic field; and wherein this method comprises the stages of:

calibrating the device for at least one operating point, wherein minimum temperature, minimum flow, maximum temperature and maximum flow measurements are made at least one operating point and are stored in the device as predetermined operating limits;

measuring the inlet flows and temperatures to the device;

selecting the percentage opening of each valve through the control unit; and operating at least one electrically-operated valve.

15. The method according to claim 14, wherein in the calibration stage, minimum temperature, minimum flow, maximum temperature and maximum flow values for at least two operating points are stored.

16. The method according to claim 15, wherein when the water outlet is changed from a first operating point to a second operating point maintaining settings for the first operating point, the method comprises the stages of:

closing the outlet at the first operating point;

maintaining the positions of the electrically-operated valves of the device ignoring calculation of the output parameters;

opening the outlet at the second operating point; and maintaining the selected percentage opening of the valves defined for the first operating point independently of the flow measurements.

17. The method according to claim 15, wherein the limiting operating conditions for each operating point are indicated to the user depending on the maximum flow and temperature values.

18. The method according to claim 14, wherein the stage of operating device opens at least one electrically-operated valve in relation to appearance of the output parameters calculated using the parameters set by the user.

19. The method according to claim 14, wherein the values defined in the calibration stage may be modified remotely using the communications board located in the control unit.

20. The method according to claim 14, wherein the operating stage may be monitored using the communications board located in the control unit.

* * * * *